United States Patent [19]
Pagani et al.

[11] 3,753,662
[45] Aug. 21, 1973

[54] SYNTHESIS REACTOR WITH PARTICULAR COOLING MEANS FOR EXOTHERMIC REACTIONS AT HIGH PRESSURE

[75] Inventors: Giorgio Pagani; Giorgio Gramatica, both of Milan, Italy

[73] Assignee: Montecatini Edison S.p.A., Milan, Italy

[22] Filed: Nov. 3, 1970

[21] Appl. No.: 86,413

Related U.S. Application Data

[63] Continuation of Ser. No. 675,988, Oct. 17, 1967, abandoned.

[30] Foreign Application Priority Data
Oct. 18, 1966 Italy ............................ 28,961 A/66

[52] U.S. Cl.............. 23/289, 23/288 K, 423/361, 165/103, 165/142, 260/449.5
[51] Int. Cl. ............................................. B01j 9/04
[58] Field of Search ............... 23/289, 288 K, 199; 165/103, 142

[56] References Cited
UNITED STATES PATENTS
2,391,315  12/1945  Hulsberg .......................... 23/288 K
2,174,318  9/1939  Ellis .................................... 165/142
2,898,183  8/1959  Fauser ............................. 23/289 X Primary Examiner—James H. Tayman, Jr.
Attorney—Curt M. Avery, Arthur E. Wilfond, Herbert L. Lerner and Daniel J. Tick

[57] ABSTRACT

Apparatus for high pressure-exothermic and catalytic reactions in the gaseous phase, for instance the synthesis of ammonia or methanol, has a substantially cylindrical shape and contains more than one superimposed catalyst bed and a cooling heat exchanger of the tube bundle type, the tube bundle is contained in a substantially cylindrical and coaxial shell and is longitudinally and completely partitioned into first and second separate halves by a plane baffle which substantially contains the axis of said tube bundle. The outlet opening on the shell side of the first half is directly connected to the inlet of a first catalyst bed. The inlet opening on the shell side of the second half is directly connected to the outlet of said first catalyst bed. The outlet opening on the shell side of the second half is directly connected to the inlet of a subsequent catalyst bed.

7 Claims, 3 Drawing Figures

United States Patent [19]
Pagani et al.
[11] 3,753,662
[45] Aug. 21, 1973
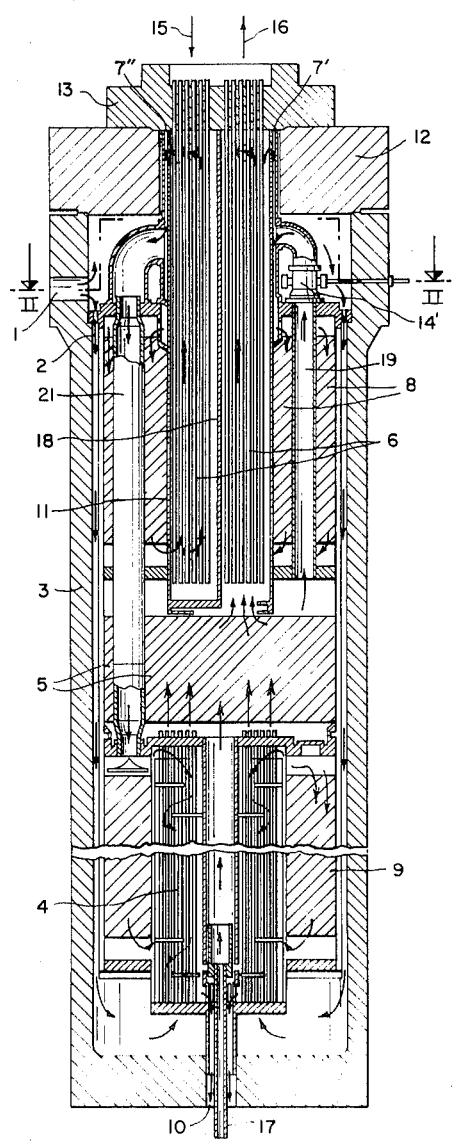

SYNTHESIS REACTOR WITH PARTICULAR COOLING MEANS FOR EXOTHERMIC REACTIONS AT HIGH PRESSURE

The present application is a continuation-in-part of application Ser. No. 675,988, filed Oct. 17, 1967 and now abandoned.

The application relates to a synthesis reactor for exothermic reactions at high pressure, for instance the synthesis of ammonia or of methanol. The reactor is particularly suitable for high capacities and is able to produce recovery steam at high thermal levels, e.g. at a pressure of 150 kg/cm$^2$.

The reactor according to our invention has three adiabatic catalytic layers with two intermediate coolings.

Figure 1:
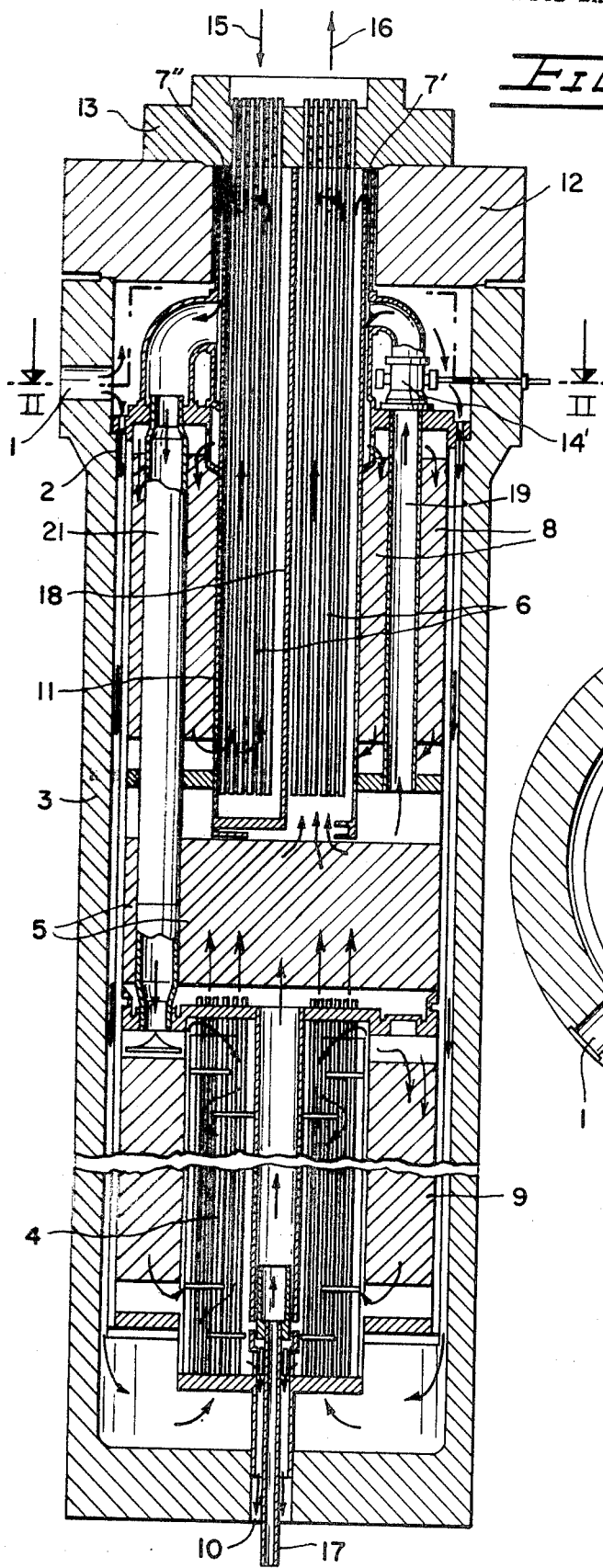
Figure 2:
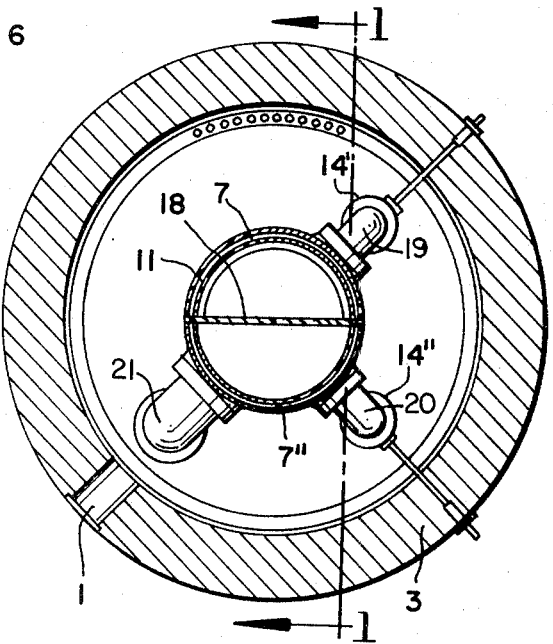
Figure 3:
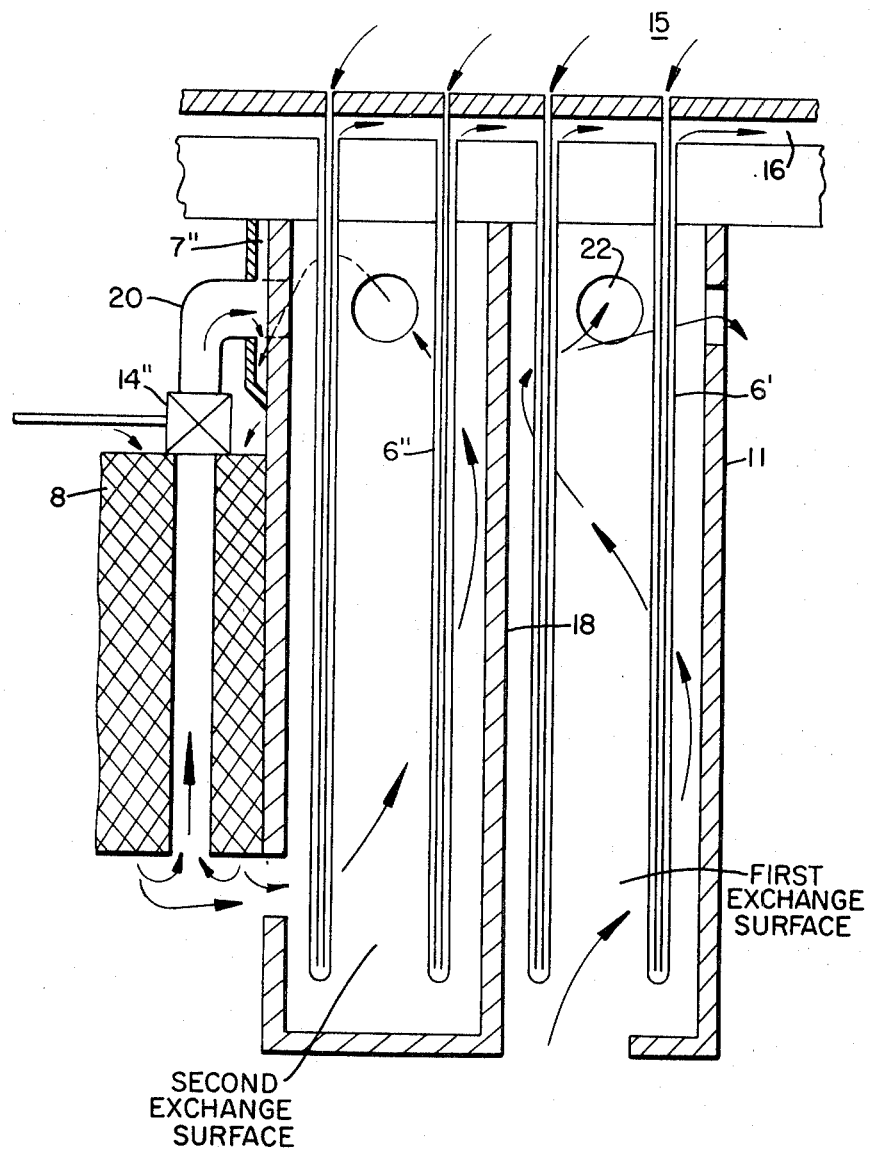

In the Drawings, FIG. 1 schematically shows a vertical section of the reactor of our invention taken along the line I—I in FIG. 2. FIG. 2 is a detail of FIG. 1, along II—II in larger scale to more clearly show the apparatus of the invention; this Figure is self-explanatory with respect to FIG. 1. FIG. 3 is a detail of FIG. 1 and shows the tube bundles in greater detail. The Figure is otherwise self-explanatory.

The fresh mixture enters the upper part of the reactor through gas inlet 1. The gas then descends towards the bottom of the reactor through interspace 2 existing between the internal apparatus and the pressure casing 3 and enters into the tubes of the preheater 4. In this way the upper part of the apparatus, where all the seals and by-pass valves are located, and the inner wall of the pressure casing are continuously and safely cooled.

After preheating in the regenerator or heat exchanger, the reacting gas passes upward through the first layer of catalyst 5 and is cooled in the first exchange surface of the so-called "candle," or "hair-pin boiler" 6. Subsequently, the gas passes through an opening 22 into an annular interspace 7, 7′, 7″ passes through the second layer 8 of catalyst, is cooled in the second exchange surface of the candle 6 and is led through tube 21 to the third layer of catalyst 9. The hot reacted gases pass along the outside of the tubes of the regenerator, in countercurrent with the fresh gas, and leave the reactor bottom at 10.

The internal apparatus consists of two "baskets." The upper basket comprises substantially the first and the second layer of catalyst, and the container 11 of the candle, while the lower basket comprises the third layer of catalyst and the regenerator.

The candle is of the tube nest (pipe bundle) type and is fixed to the cover 12 of the reactor. This allows for easy removal without having to remove the cover of the reactor. The reaction heat is removed, directly producing vapor in the candle. The container of the candle is subdivided into two halves. The seal 18, between the two above-mentioned halves and the tube sheet 13 of the candle, is of the type usually employed in heat exchangers with more than one passage.

The regulation of the temperature between the layers is achieved by by-passing part of the hot gas directed to the two cooling surfaces of the candle. The valves 14′ and 14″ employed, e.g. butterfly valves, are operated from outside. In the drawing of FIG. 1, only one of the two by-passes 19 and 20 has been represented, in order to simplify.

A feature of our reactor is the original cooling system between the layers for removing and recovering at very high thermal level the reaction heat.

In fact, owing to the particular form, i.e., divided in two sections, of the candle and of the corresponding container, divided in two halves, it is possible to produce directly steam at high pressure and carry out an easy and safe regulation of the temperature between the layers, by by-passing part of the gas directed to the two sections of the candle.

Moreover, the possibility of extracting the candle, of the tube nest (pipe bundle) type, without having to remove the cover, simplifies the occasional maintenance operations of the candle. The candle thus has the function of a forced-circulation furnace (with the aid of an external circulation pump, not shown) or of a natural circulation furnace.

For greater clarity, a complete legend of the parts illustrated in the drawing with the reference numbers therein follows.

1 — fresh gas inlet (fresh mixture)
2 — interspace between internal apparatus and pressure casing
3 — pressure casing
4 — regenerator (heat exchanger)
5 — first layer (bed) of catalyst
6, 6′ and 6″ — cooling candle
7 and 7″ — annular interspace
8 — second layer (bed) of catalyst
9 — third layer (bed) of catalyst
10 — gas exit
11 — candle container
12 — reactor cover
13 — tube sheet of the candle
14′ and 14″ — regulating valve on the candle by-pass
15 — water inlet
16 — water and steam outlet
17 — inlet for hot starting gas and cold by-pass gas of the preheater
18 — longitudinal partition or seal
19 and 20 candle by-pass pipe
21 — gas—conducting pipe In the catalized exothermic chemical reactions governed by a thermodynamical equilibrium, such as for instance the synthesis of ammonia and of methanol, it is necessary to divide the catalyst into a number of adiabatic layers arranged in series with respect to the flow of the reacting gas, and to carry out after every layer a cooling of the reacting gas, in order to enable the reaction to go on in the subsequent layer. The reactor according to the instant invention has three adiabatic layers and two intermediate cooling stages, in which cooling is effected through a heat-exchange surface. It is a characteristic peculiar of the instant invention that the cooling of the reacting gas leaving the first and second catalyst layer is effected contemporaneously and separately by one single tube-nest boiler arranged in central position in the upper region of the reactor; the boiler is in two parts in that it is housed in a cylindrical shell (container 11 of the boiler) provided with a diametric partition or seal 18 that divides it longitudinally into two parts, so that the boiler, when it is accommodated, becomes halved longitudinally into two halves. In one half (right-hand in FIG. 1), the gas leaving the first catalyst layer passes upwards and is cooled outside the tubes. In the other half (left-hand in FIG. 1), the gas leaving the second catalyst layer passes upwards and is cooled outside the tubes. Inside the boiler tubes from both sides there is introduced water that vaporizes (evaporates). Thus there is carried out the contemporaneous and separate cooling of the gas leaving the first and second catalyst layer, with recovery of heat and production of high pressure steam; the boiler can be easily extracted from the reactor without having to take off the cover 12 and without having to take out the whole equipment.

Another characteristic peculiar of the instant invention is the particular system for adjusting the temperatures, namely the amount of heat exchanged in each one of the two parts into which the boiler is divided. This adjustment is carried out by varying the amount of gas passing through the boiler. That is to say, the gas that leaves the first catalyst layer is divided into two parts; one portion of gas passes through one half (right-hand in FIG. 1) of the boiler and is cooled down. The remaining portion passes through a by-pass pipe 19, 20 of the boiler, is not cooled and joins the portion of gas cooled in said half (right-hand in FIG. 1) of the boiler, at the inlet of the second catalyst layer, to control the amount of gas that passes through the bypass pipe 19, 20 and, therefore, to adjust the temperature at the inlet of the second catalyst layer. The by-pass pipes 19 and 20 are, provided with butterfly valves 14' and 14'', respectively placed at the inside of the reactor, immediately under the cover in a position easily accessible, and controlled from the outside. The same by-pass system is provided on the other half (left-hand in FIG. 1) to control the cooling of the gas leaving the second catalyst layer and, therefore, to adjust the temperature at the inlet of the third catalyst layer. The arrows 15 and 16 respectively represent the supply line for cooling water to the cooling candle 6 and the exhaust or exit line for hot water and steam from the cooling candle.

EXAMPLE

To further illustrate the invention and not to limit the same, are given data for the dimensioning of a 1,000 t/d $NH_3$ reactor, according to the present invention:

|  | Temp. (°C) | $NH_3$ Content (Mol-%) |
|---|---|---|
| Reactor entrance | 50 | 2.1 |
| Entrance first catalyst layer | 400 | 2.1 |
| Exit first catalyst layer | 526 | 10.4 |
| Entrance second catalyst layer | 433 | 10.4 |
| Exit second catalyst layer | 501 | 15.4 |
| Entrance third catalyst layer | 415 | 15.4 |
| Layer | 452 | 18.2 |
| Reactor exit | 96 | 18.2 |

Working pressure: 270 ata
Inert substances at the entrance into the reactor: 10 mol-%
Space velocity : 13,000 Nm³/h m³
Catalyst distribution:
   first layer     20%
   second layer     38%
   third layer     42%
Recovered heat : 580,000 Kcal/t $NH_3$
Saturated steam produced at 130 ata
Principal dimensions of the pressure casing for a capacity of 1000 t/d:
Internal diameter : 2,200 mm
Useful internal height : 16,500 mm It is to be understood that the present invention includes those variations within the reach of those skilled in the field, and the obvious constructive and functional equivalents of the embodiment here described and illustrated, as well as the relative obviously analogous applications.

We claim:

1. In apparatus for high pressure exothermic and catalytic reactions in the gaseous phase, for instance the synthesis of ammonia or methanol, which has a substantially cylindrical shape and which contains more than one superimposed catalyst bed and a cooling heat exchanger of the tube bundle type, the improvement which comprises that said tube bundle is contained in a substantially cylindrical and coaxial shell and that it is longitudinally and completely partitioned into first and second separate halves by a plane baffle which substantially contains the axis of said tube bundle, wherein:
   a. the outlet opening on the shell side of the first half is directly connected to the inlet of a first catalyst bed;
   b. the inlet opening on the shell side of the second half is directly connected to the outlet of said first catalyst bed;
   c. the outlet opening on the shell side of the second half is directly connected to the inlet of a subsequent catalyst bed.

2. The reactor of claim 1, containing means for extracting the cooling heat exchanger without removing the cover.

3. The reactor of claim 1, containing in its interior means for regulating the temperature between the catalyst layers in said reactor.

4. The reactor of claim 1, containing three catalyst beds, the first bed occupying in the reactor an intermediate position between the second bed above the first bed and the third bed below the first bed.

5. The reactor of claim 1, wherein the cooling heat exchanger functions as a natural boiler.

6. The reactor of claim 1, wherein the cooling heat exchanger functions as a forced circulation boiler.

7. The reactor of claim 1, containing means for adjusting the temperatures of the gas between the catalyst beds, said means consisting of tubes inside the reactor by-passing the heat exchanger, said tubes being provided with their own valves placed upstream of said tube and inside the reactor in its upper part in a position of eacy accessibility and controlled from the outside to control the flow of gas from the second of said two catalyst beds.

* * * * *